UNITED STATES PATENT OFFICE.

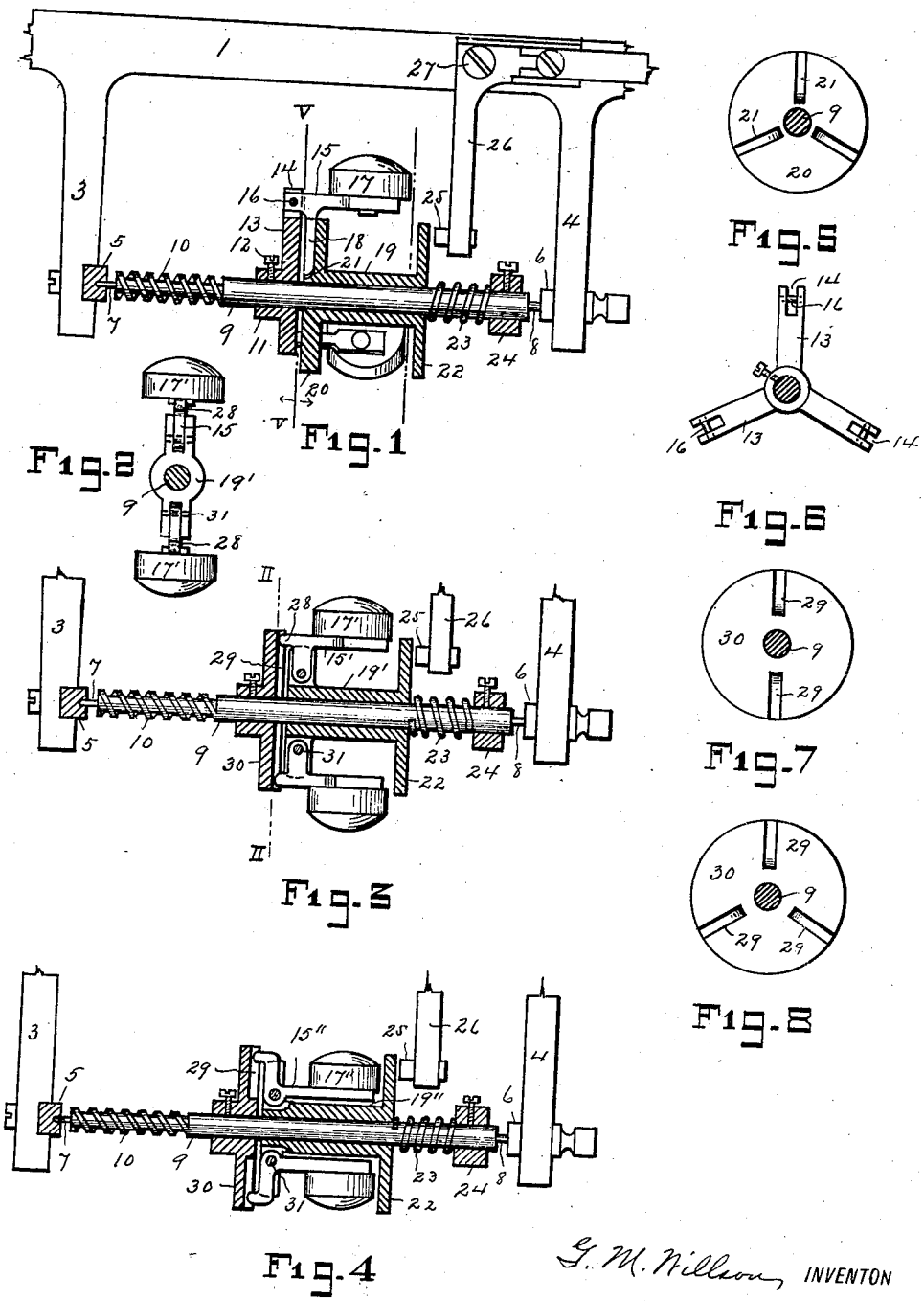

GEORGE M. WILLSON, OF WILLIAMSPORT, PENNSYLVANIA.

SPRING-MOTOR GOVERNOR.

1,378,206.

Specification of Letters Patent.   Patented May 17, 1921.

Application filed April 30, 1919.   Serial No. 293,669.

*To all whom it may concern:*

Be it known that I, GEORGE M. WILLSON, a citizen of the United States, residing in the city of Williamsport, county of Lycoming, and State of Pennsylvania, have invented a certain new and useful Improvement in a Spring-Motor Governor, of which the following is a specification.

Spring motors of the type to which my invention is applied are in very general use as the driving power for phonographs and talking machines. In such motors it is essential that the record carrying spindle should rotate at a uniform velocity at speeds running from 75 R. P. M. to 85 R. P. M., with means for changing the speed, and when so changed, for maintaing the speed without material variation. It has been the practice to provide governing mechanism driven by worm gear, such governing mechanism consisting of a plurality of centrifugal weights secured to flat springs; one end of the springs being fixed to a collar which is rigidly mounted upon the governor shaft, and the other ends connected to a sliding sleeve upon which a disk is fixed, the structure being such that the weights fly outwardly away from the center of rotation to a distance determined by the speed of rotation, the disk itself being restrained in its sliding movement upon the shaft by means of an adjustable felt brake. In the use of governors of this type it frequently happens that the springs upon which the centrifugal weights are mounted will break and thus put the entire motor out of commission. It is to overcome this difficulty of breaking governor springs that I have designed the structure, a detailed description of which follows.

In the accompanying drawings forming a part of this specification,

Figure 1 is a side elevation of so much of a spring motor as is necessary to convey an understanding of the application of my improvement.

Fig. 2 is a section on lines II—II of Fig. 3.

Fig. 3 illustrates a modification.

Fig. 4 illustrates a still further modification.

Fig. 5 illustrates an end view of the spool.

Fig. 6 is a plan view of the spider which supports the centrifugal weights as shown in Fig. 1.

Fig. 7 is a plan view of the abutment disk of the modification illustrated in Figs. 3 and 4.

Fig. 8 illustrates an abutment disk showing three radial cam grooves for use where three centrifugal weights, like those illustrated in Figs. 3 and 4, are used.

Similar reference numerals refer to like parts throughout the specification and drawings.

The frame 1, which supports the gear train of the motor, is of the usual type and substantially the same as that used in the well known Meisselbach motor. It is provided with the two downwardly extended posts, or stanchions 3 and 4. Upon the stanchion 3 is mounted the laterally adjustable bearing block 5, and in the stanchion 4 is the longitudinal adjustable bearing 6. These bearings are each provided with pivot sockets to receive the pivots 7 and 8, upon the ends of the governor shaft 9. This shaft is provided with a "quick" worm thread 10, which is driven by the ordinary worm wheel (not shown) common in this type of motors. Mounted upon the shaft 9 is a spider 11, rigidly secured in place by means of the set screws 12. The spider, as shown, is provided with the three arms 13, the outer ends of which are bifurcated as at 14, in which the ends of the governor arms 15 are pivoted upon the pins 16. The arms 15 extend parallel to the axis of the shaft 9, and are provided with the weights 17, upon their free ends. They are also provided with the radial projecting arms 18, all of which extend toward the center of the shaft 9. Upon the shaft 9 is mounted the loosely sliding spool 19 the flanged end 20 of which is provided with three radial grooves 21, in which the inwardly projecting arms 18 are located. The opposite end of the spool is provided with the brake flange 22. Next outside of the flange 22 is a coil spring 23, which is located between the end of the spool and the adjustably fixed collar 24 upon the shaft 9 and by which the tension of said spring may be regulated.

The structure is such that when the shaft 9 is rotated the centrifugal weights 17 will fly outwardly away from the center of rotation, causing the arms 18 to bear in the slots 21 of the flange 20, thereby crowding the spool 19 away from the spider 11 and compressing the spring 23. The degree of such compression being governed entirely by the speed of the shaft 9.

In order to restrain the longitudinal movement of the spool 19 under the influence of the centrifugal weights 17, the usual brake 25, mounted upon the end of the bell crank lever 26, which latter is pivoted at 27 upon the frame 1, is provided. The manipulation of the bell crank 26 to move the brake felt 27 to the right or to the left will determine the movement of the spool 19. When the flange 22 comes into rubbing contact with the brake felt 25, it will produce a friction drag upon said spool and thus restrain the speed of the shaft 9.

In Fig. 3, I have shown a slight modification of the structure in mounting the arms 15' upon the spool 19', and provided the arm 15' with a projection 28 to bear in a radial slot 29 of an abutment disk 30, which latter is rigidly mounted upon the shaft 9 in substantially the same manner as the spider 11, shown in Fig. 1.

The spring 23, located between the end of the spool 19 and the adjustable collar 24, is compressed in substantially the same manner, as will be readily understood. Fig. 4 is substantially the same as Fig. 3, with the exception that the weights 17" upon the arms 15" are located closer to the center of rotation of the shaft, in fact the arms 15" are bell cranks pivoted in the spider-like flange 31, upon the end of the spool 19". The other elements of the structure are substantially the same as those illustrated in Figs. 1 and 3, and need no further description.

It will thus be seen that in each of the modifications illustrated I have dispensed with the usual flat weight supporting springs and substituted therefor rigid weight supporting arms, pivoted in such a manner as to permit of the weights to swing outwardly away from the center of rotation and utilize such centrifugal force to shift the disk 22 longitudinally against a single coil spring 23, which in practice I find substantially indestructible.

It will be readily understood that if desired I may provide the modifications illustrated in Figs. 3 and 4, with three weights instead of two, as shown. In this case the abutment disk 30 will be provided with the three radial grooves 29, as illustrated in Fig. 8, instead of the two as illustrated in Fig. 7.

I claim:

1. In a spring motor governor, the combination of a rotatable governor shaft, a spider rigidly mounted thereon, centrifugal weights pivotally mounted upon said spider, a loosely sliding spool upon said shaft, arms upon said weights coöperating with said spool to move it in one direction, an adjustable collar upon said shaft and a spring upon said shaft between said collar and spool for opposing the movement of said spool under the influence of said weights.

2. In a spring motor governor, the combination of a rotatable governor shaft, a loosely sliding spool mounted thereon, a plurality of centrifugal weights pivotally supported to rotate with said shaft, said weights having rigid arms bearing upon the end of said spool to move it in one direction, an adjustable collar upon said shaft and a spring upon said shaft between said collar and spool bearing upon the end of said spool to oppose the movement thereof under the action of said weights.

3. In a spring motor governor, the combination of a governor shaft, a plurality of centrifugal weights having rigid arms pivotally mounted upon said shaft to rotate therewith, a loosely sliding spool upon said shaft, said spool having means upon one end thereof for coöperating with the arms upon said weights, whereby said spool will move along said shaft as said weights swing away from said shaft, an adjustable collar upon said shaft and a coil spring mounted upon said shaft between said collar and spool and bearing upon the end of said spool to oppose its movement under the influence of said weights.

4. In a spring motor governor, the combination of a governor shaft, a plurality of centrifugal weights, means for pivotally supporting said weights upon said shaft, a sliding spool upon said shaft, said spool having a radially grooved flange at one end thereof for coöperating with said weights, whereby said spool is moved longitudinally along said shaft as said weights swing away from the center of rotation thereof, an adjustable collar upon said shaft and a spring upon said shaft between said collar and spool bearing upon the end of said spool for resisting the action of said weights.

5. In a spring motor governor, the combination of a governor shaft, a plurality of governor weights pivotally mounted thereon, said weights being each provided with a radially projected arm, a sliding spool upon said shaft, said spool having a plurality of radial grooves in the outer face thereof in which said arms are located, whereby as said weights swing away from the center of rotation said spool will move along said shaft, an adjustable collar upon said shaft and a spring upon said shaft between said collar and spool bearing upon the end of said spool and opposing its movement.

G. M. WILLSON.